(12) United States Patent
Boldy

(10) Patent No.: US 6,574,825 B1
(45) Date of Patent: Jun. 10, 2003

(54) CLEANING DEVICE FOR ELECTRONIC DEVICES

(75) Inventor: Manfred Boldy, Horb (DE)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 09/715,697

(22) Filed: Nov. 17, 2000

(30) Foreign Application Priority Data

Nov. 30, 1999 (DE) .......... 199 57 639

(51) Int. Cl.[7] .......... A47L 13/16
(52) U.S. Cl. .......... 15/244.4; 15/224; 15/244.1; D4/137; D32/40
(58) Field of Search .......... 15/209.1, 210.1, 15/223, 224, 244.1, 244.4; D4/137; D32/35, 40, 52

(56) References Cited

U.S. PATENT DOCUMENTS

| 416,184 | A | * | 12/1889 | Riddle | 15/209.1 |
|---|---|---|---|---|---|
| 2,842,789 | A | * | 7/1958 | Wells | 15/244.1 X |
| 3,204,278 | A | * | 9/1965 | Lambros | 15/244.1 |
| D220,074 | S | * | 3/1971 | Morris | D4/137 |
| 3,707,012 | A | * | 12/1972 | Lane | 15/244.4 X |
| 4,111,666 | A | * | 9/1978 | Kalbow | 15/244.4 X |
| 6,032,314 | A | * | 3/2000 | Bowd | 15/244.4 X |
| D429,860 | S | * | 8/2000 | Denney | D32/40 |
| D446,895 | S | * | 8/2001 | Denney | D32/40 |

FOREIGN PATENT DOCUMENTS

| FR | 1106965 | * | 7/1955 | 15/244.4 |
|---|---|---|---|---|
| GB | 444265 | * | 3/1936 | 15/244.1 |
| NO | 86282 | * | 8/1955 | 15/244.1 |

* cited by examiner

Primary Examiner—Mark Spisich
(74) Attorney, Agent, or Firm—J. Bruce Schelkopf; Bracewell & Patterson LLP

(57) ABSTRACT

The invention concerns a cleaning device for casing components of electronic devices such as laptop computers, keyboards, monitors and such which are susceptible to dust. The device has a cuboidal block (10) made of a flexible material which on its underside, which is the surface of the block intended to contact the surface being cleaned, has a large number of incisions (14) which run crossways and form flexible fins (16) which can be deflected outward toward both sides. When the device is in use the fins spread and create slits (22) to collect dust. The incisions preferentially stretch over two thirds of the height of the block and run virtually parallel to its sides, so that the fins have a rectangular cross-section. The block is preferentially made of a soft foam.

1 Claim, 3 Drawing Sheets

CLEANING DEVICE FOR ELECTRONIC DEVICES

BACKGROUND OF THE INVENTION

1. Technical Field

The invention concerns a cleaning device, in particular for casings of electronic devices.

2. Description of the Related Art

Electronic devices such as laptop computers, keyboards, monitors and suchlike are highly susceptible to dust. This applies in particular to devices with black casings. The components which require more frequent cleaning primarily include monitors, keyboards and other sensitive surfaces on which keys, buttons, card bays or displays are mounted. Conventional brushes and cloths are only suitable to a limited degree for cleaning of such devices and components, because they only partially take up the dust, while merely spreading most of it around the surface being cleaned. In order to improve cleaning efficiency, brush cleaning devices have been developed which are fitted with a dust collector and have an ultrasound device to assist the cleaning process. Reference is made to EP0872782 in this regard. Mains or battery powered hand-held vacuum cleaners are also used, such as disclosed in EP0820716.

SUMMARY OF THE INVENTION

An object of the invention is to provide a simple and effective cleaning device for electronic devices by means of which a high level of cleaning effect accompanied by efficient dust collection can be attained.

A further object of the invention is to provide a cleaning device which is particularly suitable for safe cleaning of sensitive surface components such as displays and high-gloss plastic surfaces, thereby also avoiding the use of liquid cleaners and their disadvantages, such as streaking, solvent vapors, etc.

A further object of the invention is to provide effective cleaning of electronic devices without use of electric power such as from the mains or a battery source.

The cleaning device in accordance with the invention, as defined in the Claims, comprises a block made of a flexible material which, on its underside intended to contact the surface being cleaned, has a large number of incisions which run crossways and form flexible fins which can be deflected outward toward both sides. When the device is in use the fins spread and create slit openings to collect the dust. The incisions preferably cover two thirds of the block and run virtually parallel to its sides, so that the fins have a rectangular cross-section. The block may preferentially be made of a soft foam.

Where larger versions of the cleaning device are used, the block may be joined to a rigid plate on its top in order to prevent the block bending during cleaning. The plate may have a handle on its top to provide improved handling of the device.

BRIEF DESCRIPTION OF THE DRAWINGS

Two embodiments of the invention are described in the following on the basis of drawings.

DETAILED DESCRIPTION OF THE PREFERRED EMBODIMENT

Figure 1:
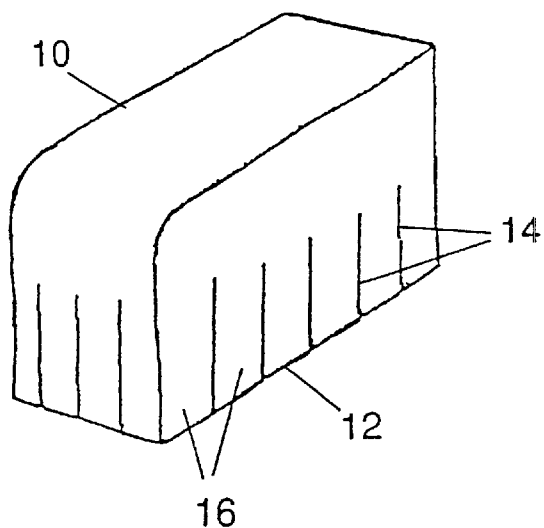
FIG. 1 shows a perspective of a first embodiment of the cleaning device in accordance with the invention.
Figure 2:
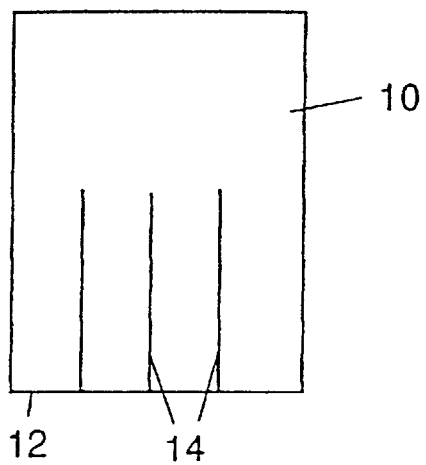
FIG. 2 shows a front view of the device shown in FIG. 1.
Figure 3:
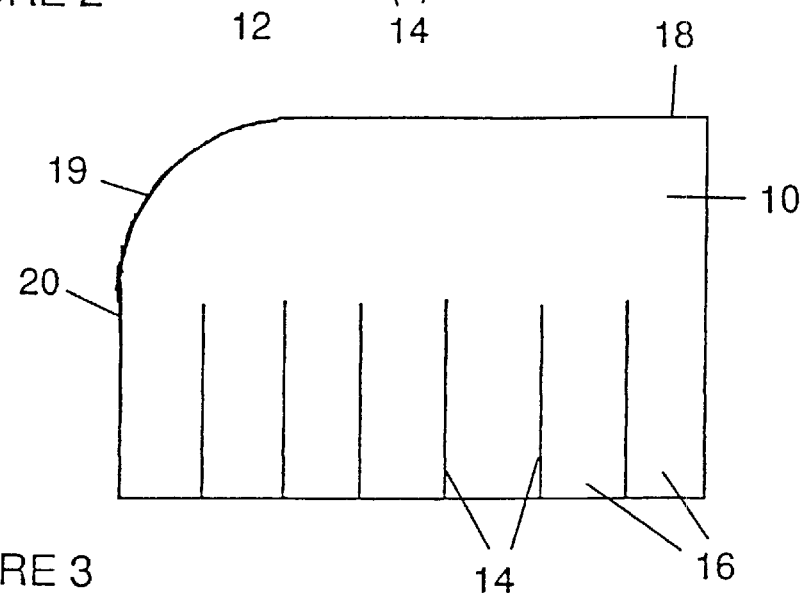
FIG. 3 shows a side view of the device shown in FIG. 1.
Figure 4:
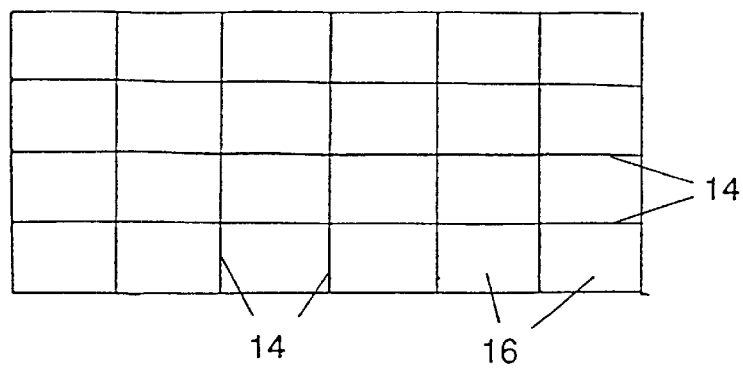
FIG. 4 shows a view from below of the device shown in FIG. 1.

The cleaning device presented in FIG. 1 consists of a preferentially cuboidal block 10 made of a flexible material. The material may, for example, be a soft foam such as a polyethylene or PVC based foam. On its underside 12, which is the surface of the block intended to contact the surface being cleaned, the block 10 has a large number of incisions 14 which run orthogonally to each other and form flexible fins 16 which can be deflected outward toward both sides. The fins have the shape of ridges which are fixed on one end, and may also be termed tentacles. The incisions 14 stretch to at least half the height of the block 10, but preferentially to is two thirds of its height. The gaps between the incisions 14 differ in the longitudinal and transverse directions of the block, but within the length of the block are each the same and also each the same across the width of the block, so that the fins have a rectangular cross-section (FIG. 4).

The gap between the incisions 14 is chosen such that the fins 16 oppose the lateral deflection with their own intrinsic stability. A cross-section of the fins 16 of 10×15 mm has proven successful. The block 10 has on its narrow side between its top surface 18 and one of its side surfaces 20 a curvature 19 which permits improved handling of the cleaning device.

Figure 5:
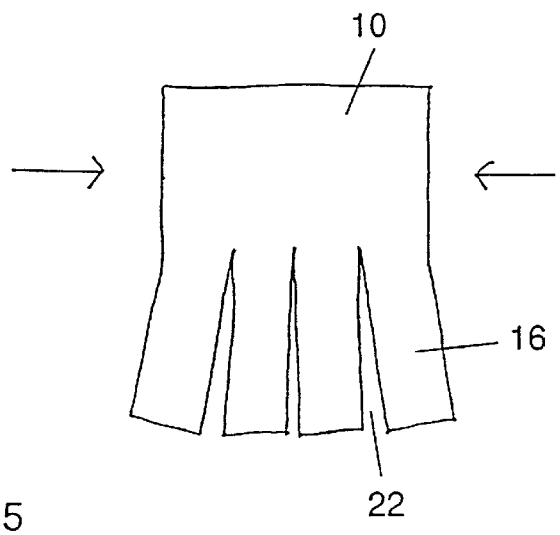
FIG. 5 shows a front view of the device shown in FIG. 1 when in use.
Figure 6:
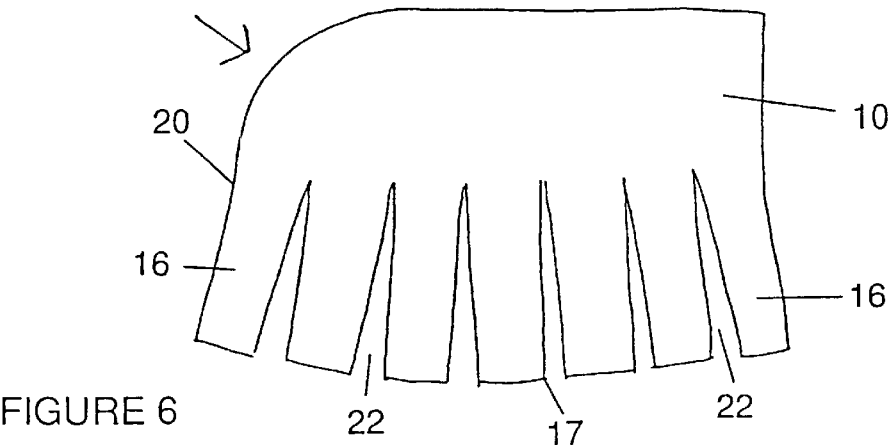
FIG. 6 shows a side view of the device shown in FIG. 1 when in use.
Figure 7:
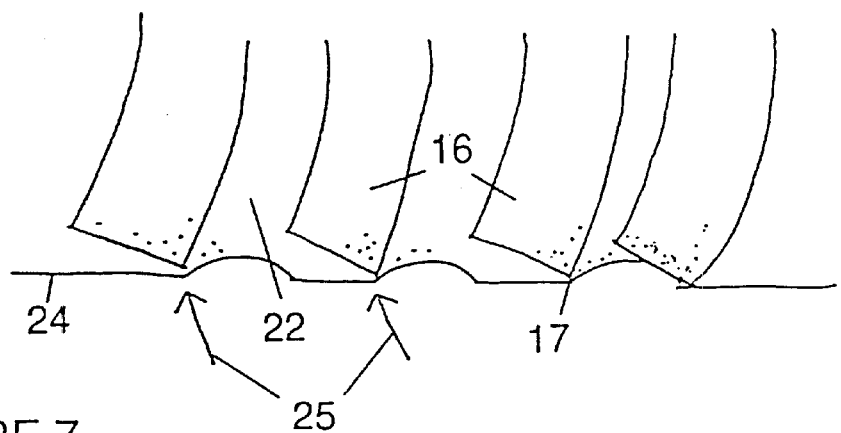
FIG. 7 shows a schematic view of the cleaning operation of the device shown in FIG. 1.

The cleaning device is used like a brush. The block 10 is gripped on both sides at the top, with the index finger pressed onto the curvature 19. This causes the block 10 to open on its underside and the fins 16 spread and form slits 22. The arrows in FIGS. 5 and 6 indicate the location and direction of the grip pressure. The block 10 is then placed on the surface 24 being cleaned and moved across the surface in its longitudinal direction. In this process the dust particles are swept off the surface 24 and collected by the slits 22 and the pores of the foam on the front faces of the fins 16. The edges 17 of the fins 16 act as the sweepers. FIG. 7 shows a schematic view of the cleaning process and the sweeping effect. The arrows 25 designate areas in which the edges 17 of the fins 16 act as sweepers and sweep dust particles into the slits 22. In this way a good cleaning effect is achieved which, in particular, also picks up electrostatically charged dust particles and hairs.

Figure 8:
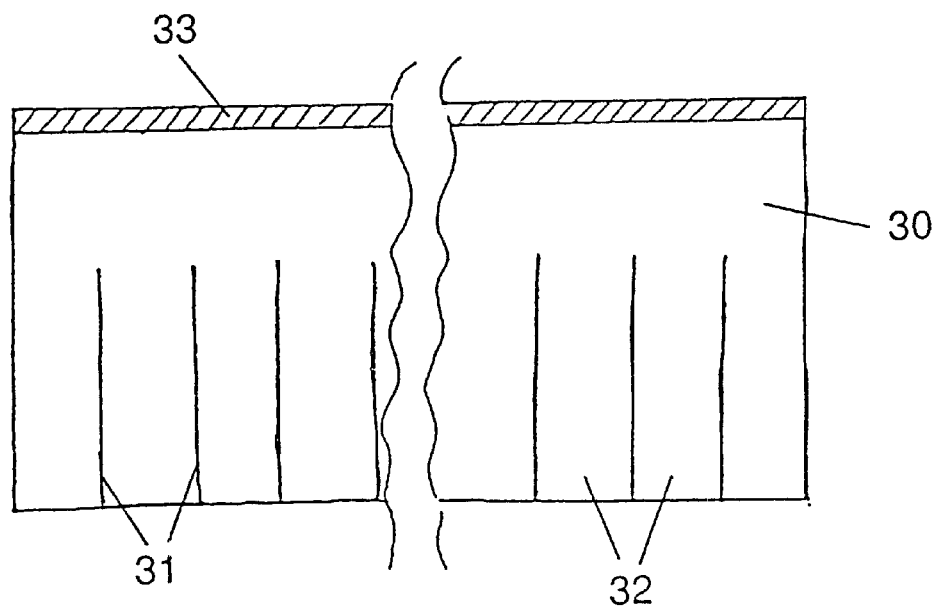
FIG. 8 shows another embodiment of device in accordance with the invention in a side view and as a partial section.

FIG. 8 shows another embodiment of the invention. This embodiment of the invention has a block 30 which corresponds to the block 10 and is likewise made of flexible material. The block 30 has a rectangular horizontal projection and on its underside has a large number of incisions 31 which, like the incisions 14 on the block 10, run orthogonally to each other and form flexible fins 32 which can be deflected outward toward both sides and which have a rectangular cross-section. The block 30 is wider and longer than the block 10 and on its top it is joined to a rigid plate 33 which prevents the block 30 from bending during cleaning. The plate 33 shown in section in FIG. 8 may be made of a hard plastic and on its top may have a handle (not shown) to provide improved handling of the device. The device as presented in FIG. 8 is particularly suitable for cleaning large surface areas.

The invention has been described on the basis of two embodiments of the invention. Derivations of the embodiments shown and described, or other embodiments of the invention, lie within the framework of the following Claims.

What is claimed is:

1. A cleaning device for cleaning casings of electronic devices, comprising:

an elongated generally rectangular block formed from a flexible, soft foam material, the block having a top, a bottom opposed to the top for contacting a surface being cleaned, a pair of opposing sides extending along the length of the block and a pair of opposing ends, the ends of the block being shorter than the sides, the block having a curvature defining an arcuate surface extending across the one end from one side to the other, the curvature extending between the one end and said top and which facilitates improved handling of the device, the distance between the top and the bottom is greater than a distance between the sides;

a plurality of longitudinal and lateral incisions formed in the bottom of the block, the longitudinal and lateral incisions being perpendicularly arranged with respect to each other such that they define an orthogonal pattern, the longitudinal incisions being substantially parallel to the sides and the lateral incisions being substantially parallel to the ends, each of the incisions having a depth that extends from the bottom of the block to a range defined by half and two-thirds of a distance between the bottom and top of the block; and the longitudinal incisions are separated by substantially equal lateral distances and the lateral incisions are separated by substantially equal longitudinal distances, the spacing between the lateral incisions being greater than that between the longitudinal incisions so as to define a plurality of flexible rectangular fins the long sides of which are substantially parallel to the sides of the block and the short sides of which are substantially parallel to the ends of the block, the fins formed by the incisions being deflectable outward toward the sides and ends of the block to define slits that collect dust.

* * * * *